United States Patent [19]
Arpino

[11] 3,794,893
[45] Feb. 26, 1974

[54] D. C. MOTOR AND POWER SUPPLY THEREFOR

[75] Inventor: Ronald G. Arpino, Branford, Conn.

[73] Assignee: Sperry Rand Corporation, Bridgeport, Conn.

[22] Filed: Mar. 12, 1973

[21] Appl. No.: 340,565

[52] U.S. Cl.................... 318/138, 318/440, 321/8, 307/70
[51] Int. Cl............................................ H02m 7/04
[58] Field of Search ... 318/138, 244, 245, 249, 345, 318/440, DIG. 1; 320/1; 307/70; 321/8; 323/DIG. 1

[56] References Cited
UNITED STATES PATENTS

| | | | |
|---|---|---|---|
| 3,379,946 | 4/1968 | Croymans............................ | 318/138 |
| 3,466,521 | 9/1969 | Lagier............................ | 318/249 X |
| 3,508,134 | 4/1970 | Dosch et al...................... | 318/345 X |
| 3,582,738 | 6/1971 | Claassen.............................. | 318/249 |
| 3,628,047 | 12/1971 | Cronin et al................... | 323/DIG. 1 |
| 3,478,258 | 11/1969 | Tamisi Nagai..................... | 321/18 |

Primary Examiner—Gerald Goldberg
Attorney, Agent, or Firm—Charles R. Miranda; Donald P. Walker

[57] ABSTRACT

A network including a D.C. motor and a transformerless voltage reducing power supply for driving the motor. The network includes a series circuit branch adapted to be connected across a source of supply of A.C. power. The series circuit branch includes the motor, a capacitor and two rectifying devices, connected in series with one another. The rectifying devices are connected in the same conductive direction. During alternate half cycles of source output voltage the source charges the capacitor in series with the motor to operate the motor. The network also includes means for switching the charged capacitor into a closed loop during the other half cycles of source output voltage. The closed loop includes the charged capacitor, motor and a third rectifying device. Since the charged capacitor is thereby connected in parallel with the motor, it discharges through the motor to operate the same.

8 Claims, 4 Drawing Figures

PATENTED FEB 26 1974 3,794,893

D. C. MOTOR AND POWER SUPPLY THEREFOR

BACKGROUND OF THE INVENTION

Portable consumer products are ordinarily energized from the consumer's local line source of electrical power, an A.C. power source having an effective output line voltage of, for example, 110 to 120 VAC. When the product includes a D.C. motor having a D.C. operating voltage level lower than the effective line voltage level, for example, an operating voltage level of from 60 to 70 VDC, the product also includes a power supply for converting the available 110 to 120 VAC line voltage level to the lower 60 to 70 VDC operating voltage level required for driving the motor. Since the most efficient circuits available for this purpose include a bulky, heavy and expensive step-down transformer for reducing the effective A.C. line voltage level, which is subsequently rectified to provide the lower D.C. operating voltage level for the motor, many manufacturers of consumer products have been reluctant to incorporate low-voltage D.C. motors in inexpensive portable consumer products, even though such motors are generally more reliably and less expensively manufactured then line voltage motors.

Thus far, it has been possible to easily justify the use of a transformerless low-voltage D.C. motor power supply in an inexpensive portable consumer product application of the type wherein heat losses in the power supply may be advantageously used. Under such circumstances the function of the step-down transformer may be performed by a three terminal resistance element having two of its terminals connected to receive power from the local source, and the other terminal connected to the D.C. motor via one or more rectifiers to provide the D.C. input voltage level required for driving the motor. For example, in a Hair Dryer the heat generated by such a D.C. motor driving circuit may be used for heating air blown from the Hair Dryer by a fan driven by the motor. Although such circuits are inefficient when viewed solely from the standpoint of being D.C. motor driving circuits, they are very efficient when viewed from the standpoint of additionally serving as sources of supply of heat for drying hair.

On the other hand, under conditions wherein the heat losses of the power supply cannot be advantageously used, manufacturers have thus far been unable to justify eliminating transformers.

Accordingly, it is an object of this invention to provide an efficient, low cost, transformerless, voltage reducing power supply, for driving a low voltage D.C. motor in a portable consumer product, and particularly in a product of the type wherein the heat losses of the power supply cannot be advantageously used;

Another object is to provide an efficient and inexpensively constructed transformerless circuit in combination with a D.C. motor for driving the D.C. motor, particularly under load conditions wherein high starting torque is required; and Another object is to provide a network including a D.C. motor in series with a capacitor, wherein the capacitor is charged by the source while the motor is driven by the source during alternate half cycles of source output voltage, and wherein the charged capacitor is switched into a parallel connection with the motor for discharge through the motor during the other half cycles of source output voltage.

SUMMARY OF THE INVENTION

The invention resides in the combination of a D.C. motor with a voltage reducing power supply for operating the motor. The resulting network is adapted to be electrically connected to an A.C. power source having an output voltage with an effective A.C. voltage level greater than the D.C. operating voltage level of the motor. The network has a series circuit branch including at least two rectifiers, a capacitor and a D.C. motor electrically connected in series with one another, with the recitifiers connected in the same conductive direction. The series circuit branch is connected across the source of A.C. power when the network is connected to the source. During alternate half cycles of source output voltage the connected source charges the capacitor and drives the motor. The network also includes switching means electrically connected to the series circuit branch. The switching means is adapted to switch the charged capacitor into a closed loop during the other half cycles of source output voltage. The charged capacitor is thereby connected in parallel with the motor and discharged through the motor to operate the same during the other half cycles of source output voltage. Preferably, the motor is not shunted by a second capacitor, as a result of which the network is particularly suitable for use in applications wherein high motor starting torque is required.

DESCRIPTION OF THE PREFERRED EMBODIMENTS

Figure 1:
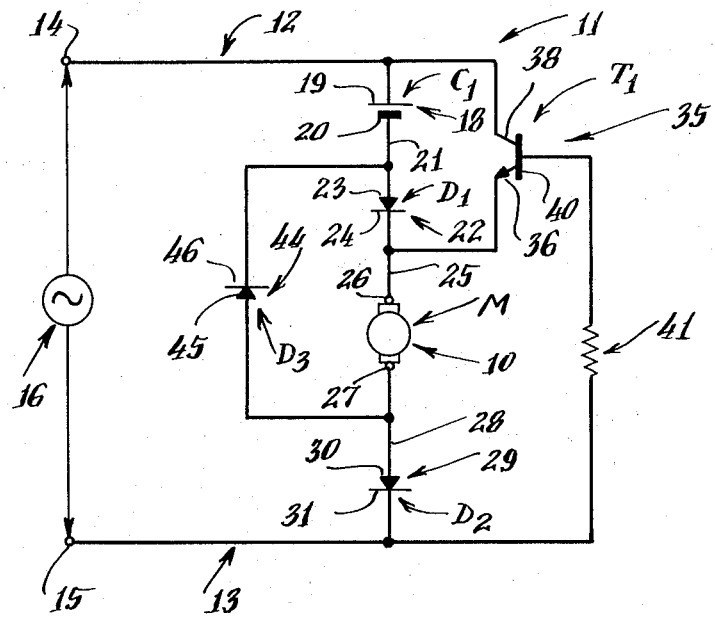
FIG. 1 is a schematic wiring diagram of a network including a D.C. motor and a transformerless voltage reducing power supply for driving the motor, the network including an NPN transistor and being shown connected to an A.C. power source.

In FIGS. 1-4, wherein like reference numerals designate like or corresponding parts throughout the several views, there is shown a network including a D.C. motor 10, and a transformerless voltage reducing power supply 11 for operating the motor 10.

As shown in FIG. 1, the power supply 11 includes a pair of conductive means 12 and 13, respectively having terminals 14 and 15 electrically connected by means wellknown in the art to receive power from an A.C. source 16, such as an A.C. source having an A.C. output voltage with an effective voltage level of from 100 to 240 VAC, depending on the consumer's location.

The network of FIG. 1 inlcudes s series circuit branch (not numbered), which is electrically connected across the conductive means 12 and 13. The series branch includes, in the order named and proceeding from conductive means 12 to conductive means 13, a capacitor 18 such as an electrolytic capacitor C1 having a positive terminal 19 and a negative terminal 20, conductive means 21, a first rectifying device 22 such as a first semi-conductor diode D1 having an anode 23 and a cathode 24, conductive means 25, the D.C. motor 10 such as a permanent magnet motor M having a positive terminal 26 and a negative terminal 27, conductive means 28, and a second rectifying device 29 such as a second semiconductor diode D2 having an anode 30 and a cathode 31.

The network (FIG. 1) also includes switching means 35 electrically connected to the aforesaid series circuit branch in shunt with the series connected capacitor 18 and first rectifying device 22. As shown in FIG. 1, the switching means 35 includes an NPN transistor T1 having an emitter 36 which is electrically connected to conductive means 25, a collector 38 electrically connected to conductive means 12, and a base 40 electrically connected through a resistor 41 to conductive means 13.

In addition, the network (FIG. 1) includes a third rectifying device 44 electrically connected to the aforesaid series circuit branch in shunt with the series connected first rectifying device 22 and D.C. motor 10. The third rectifying device 44 includes a third semiconductor diode D3 having an anode 45 and a cathode 46, respectively electrically connected to the conductive means 28 and conductive means 21.

Operation of the network of FIG. 1 differs during successive half cycles of output voltage from the connected A.C. source 16.

Figures 2, 3:
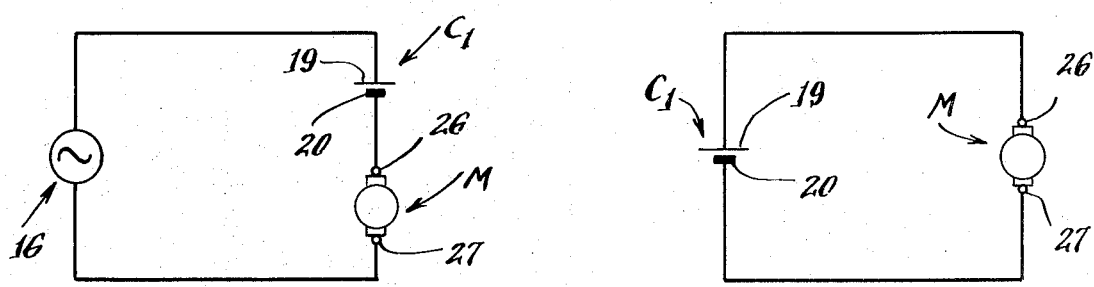
FIG. 2 is a schematic wiring diagram of a modification of the network of FIG. 1, illustrating a practical equivalent of said network during positive, alternate, half cycles of output voltage from the connected A.C. power source.
FIG. 3 is a schematic wiring diagram of a modification of the network of FIG. 1, illustrating a practical equivalent of said network during negative, alternate, half cycles of output voltage from the connected A.C. power source.

During positive half cycles of source output voltage, the potential at terminal 14 is positive relative to the potential at terminal 15. Due to the difference in potential, the first and second diodes D1 and D2 are forward biased, the third diode D3 is reverse biased, transistor T1 is biased to its cutoff condition, and conventional current from the source 16 flows through the series connected conducting means 12, capacitor C1, first diode D1, motor M, second diode D2 and conducting means 13, and returns to the source 16. Thus, when terminal 14 is at a positive potential relative to terminal 15, diodes D1 and D2 look like short circuits, diode D3 and transistor T1 look like open circuits, and the source current charges the capacitor C1 in series with the motor M and drives the motor M. As a practical matter, the equivalent circuit for operation of the network of FIG. 1 during positive, alternate, half cycles of the source output voltage is as shown in FIG. 2.

During negative half cycles of source output voltage, the potential at terminal 14 is negative relative to the potential at terminal 15. Due to this difference in potential, the first and second diodes D1 and D2 are reverse biased, the third diode D3 is forward biased, transistor T1 is biased to its saturation condition, and conventional current from the charged capacitor C1 flows in a closed loop from the capacitor's anode 19, through the transistor's collector 38, base 40 and emitter 36, then through the motor M, diode D3 and to capacitor'-cathode 20 to return to the capacitor C1. Thus, when terminal 14 is at a negative potential relative to terminal 15, diodes D1 and D2 look like open circuits, diode D3 and transistor T1 look like short circuits, and conventional current from the charged capacitor, which is in parallel with the motor M, drives the motor M. As a practical matter, the equivalent circuit for operation of the network of FIG. 1 during negative, alternate, half cycles of the source output voltage is as shown in FIG. 3.

It should be noted that the capacitor 18 is only connected in parallel with the motor 10 during one-half of each cycle of the source output voltage. During the other half cycle the capacitor 18 is connected in series with the motor 10, as a result of which the motor 10 is directly energized by the source 16. Assuming as is the usual case that the capacitor 18 is completely discharged when the network is initially connected to A.C. source 16, at the instant the capacitor 18 commences charging, substantially the entire source output voltage is impressed across the motor 10. As a result, the network according to the invention is particularly suitable for use with products wherein high motor starting torque is required. And, measures such as permanently shunting the motor 10 with a suitable capacitor (not shown) for regulation purposes, are undesirable; since such an additional capacitor would adversely effect the ability of the power supply 11 to provide instantaneous power to the motor 10 during the first cycle of source output voltage.

The network of FIG. 1, including a 150 volt electrolytic capacitor C1 of 25 microfarads, three 300 PIV semiconductor diodes D1–D3, a permanent magnet motor M having an operating voltage level of from 60 to 70 VDC and having an armature core (not shown) wound with 500 turns per pole of No. 37 AWG wire, a suitable NPN transistor T1, and a resistor 41 of 15 K ohms, was connected across a 120 VAC power source 16 as hereinbefore described, and tested with the motor M mechanically connected by well-known means to the movable cutters (not shown) of an electric shaver (not shown). The input and output power of the power supply 11 were respectively measured, by means of well-known test instruments (not shown), to be 4.70 and 3.64 watts. Thus the calculated efficiency of the power supply 11, under load, in a portable hand-held consumer product, i.e., the electric shaver (not shown), was 77.4 per cent. In addition, an effective source output voltage variation of from 100 to 130 VAC, was accompanied by a motor operating voltage variation of from 57 to 73 VDC, and a motor speed variation of from 8,000 to 10,100 RPM.

Figure 4:
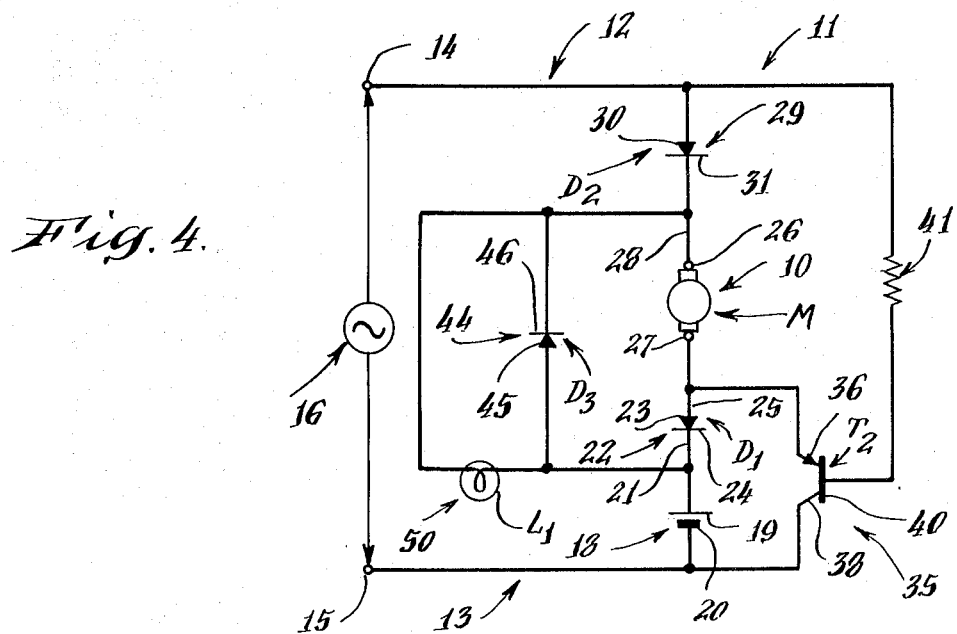
FIG. 4 is a schematic wiring diagram of another embodiment of the network of FIG. 1, the network including a PNP transistor, and including a lamp connected to the network so as to be energized when the network is connected to the A.C. power source.

A second embodiment of the network of FIG. 1 is shown in FIG. 4. As shown in FIG. 4, the NPN transistor T1 is replaced by a suitable PNP transistor T2 and the remaining network components of FIG. 1, 10, 18, 22, 29, 41 and 44, are connected to the conductive means 12 and 13, substantially as hereinbefore described but for operation of the motor 10 in a manner which is consonant with the switching characteristics of the PNP transistor T2. Inasmuch as the motor 10 (FIG. 4) is operated in a manner which is analogous to the operation thereof in FIG. 1, and consonant with the well-known switching characteristics of the PNP transistor, a discussion of the motor operating characteristics of the power supply 11 of FIG. 4 is believed to be unnecessary.

It is oftentimes desirable to provide consumer products with light sources adapted to be energized when the products are energized. This is particularly true in the case of portable consumer products since they are often used under adverse lighting conditions. Accordingly, the network of FIG. 4 additionally differs from the network of FIG. 1 in that it includes a light source 50 connected in parallel with the series circuit branch (not numbered). The light source 50 (FIG. 4), is preferably a miniature lamp L1, having, for example, a voltage rating of less than 30 volts and an internal operating resistance of about 1,000 ohms. Preferably the lamp L1 is connected across the diode D3, for continuous energization when the network is connected to the A.C. power source 16. The lamp L1 provides a visual indication that the network has been connected to a power source 16, and preferably illuminates an area in its vicinity, for example, an area adjacent to the hair cutters of an electric shaver (not shown). Of course, the light source 50 may be connected as hereinbefore described to the network of FIG. 1 without departing from the spirit and scope of the invention.

In accordance with the objects of the invention there has been described a network inlcuding a D.C. motor and a low cost, efficient, transformerless, voltage reducing power supply for operating the motor. The network includes a series circuit branch having a capacitor in series with the motor. The series branch is adapted to be connected to a source of supply of A.C. power which charges the capacitor and operates the motor during alternate half cycles of source output voltage. In addition the network includes means for switching the capacitor into a closed loop wherein the charged capacitor is connected in parallel with the motor for discharge through the motor during the other half cycles of the source output voltage.

Inasmuch as certain changes may be made in the above described invention without departing from the spirit and scope thereof, it is intended that all matter contained in the above description or shown in the accompanying drawings shall be interpreted in an illustrative rather than limiting sense. And, it is intended that the following claims be interpreted to cover all the generic and specific features of the invention herein described.

What is claimed is:

1. A network including a D.C. motor and a transformerless voltage reducing power supply for operating the motor, the network adapted to be connected across an A.C. source of power having an A.C. output voltage with an effective output voltage level, and the network comprising:
   a. a series circuit branch including a capacitor and first and second rectifying devices and the D.C. motor electrically connected in series with one another, the rectifying devices being connected in the same conductive direction, the D.C. motor having a D.C. operating voltage level which is less than the effective voltage level of the source output voltage and not having another capacitor connected thereacross, said series circuit branch being connected across the source of power when the network is connected there-across, whereby the source charges the capacitor and operates the motor during alternate half cycles of the source output voltage, and
   b. switching means electrically connected to the series circuit branch and adapted to switch the charged capacitor into a closed loop during the other half cycles of the source output voltage, said closed loop including a third rectifying device and said charged capacitor and motor and wherein the charged capacitor is electrically connected in parallel with the motor, whereby said charged capacitor discharges through the motor to operate the motor during said other half cycles of the source output voltage.

2. The network according to claim 1, wherein the capacitor and motor each have first and second terminals of opposite polarity, said first terminals being of the same polarity, the switching means includes a transistor having a conducting mode of operation and a nonconducting mode of operation, said transistor having an emitter and a collector and a base, said emitter being electrically connected to said first motor terminal, said collector being electrically connected to said first capacitor terminal, and said base being electrically connected to said series circuit branch, whereby said transistor is responsive to said source output voltage to switch said transistor to a different one of said modes of operation thereof during each successive half cycle of source output voltage.

3. The network according to claim 1 including a light source electrically connected in parallel with said third rectifying device, said light source providing a visual indication that the network has been connected to said A.C. power source.

4. The network according to claim 1, wherein said capacitor is an electrolytic capacitor.

5. The network according to claim 1, wherein at least one of said rectifying devices is a semiconductor diode.

6. The network according to claim 1, wherein said motor is a permanent magnet motor.

7. The network according to claim 2, wherein said base is electrically connected to said series circuit branch via resistance means.

8. The network according to claim 3, where said light source is an incandescent lamp adapted to provide illumination of an area in the vicinity thereof.

* * * * *